United States Patent
Barezzani

(10) Patent No.: US 10,646,987 B2
(45) Date of Patent: May 12, 2020

(54) METHOD OF OPERATING A HYDRODYNAMIC COMPRESSION TOOL AND HYDRODYNAMIC COMPRESSION TOOL

(71) Applicant: Cembre S.p.A., Brescia (IT)

(72) Inventor: Gualtiero Barezzani, Brescia (IT)

(73) Assignee: Cembre S.p.A., Brescia (IT)

( * ) Notice: Subject to any disclaimer, the term of this patent is extended or adjusted under 35 U.S.C. 154(b) by 138 days.

(21) Appl. No.: 15/312,404

(22) PCT Filed: Jun. 18, 2015

(86) PCT No.: PCT/IB2015/054589
§ 371 (c)(1),
(2) Date: Nov. 18, 2016

(87) PCT Pub. No.: WO2016/005838
PCT Pub. Date: Jan. 14, 2016

(65) Prior Publication Data
US 2017/0087709 A1  Mar. 30, 2017

(30) Foreign Application Priority Data
Jul. 7, 2014  (IT) .............. MI2014A1240

(51) Int. Cl.
*B25F 5/00* (2006.01)
*B21D 39/04* (2006.01)
(Continued)

(52) U.S. Cl.
CPC ............ *B25F 5/005* (2013.01); *B21D 39/048* (2013.01); *B23D 29/002* (2013.01);
(Continued)

(58) Field of Classification Search
CPC ..... B25B 27/026; B25B 27/146; B25F 5/005; B21D 39/048; H01R 43/0428; G01N 2203/0073
See application file for complete search history.

(56) References Cited

U.S. PATENT DOCUMENTS 5,195,042 A  3/1993  Ferraro et al.
5,490,406 A * 2/1996  College .............. H01R 43/0486
                                                      29/715
(Continued)

FOREIGN PATENT DOCUMENTS

CN  101754836 A  6/2010
EP  0 941 813 A1  9/1999
(Continued)

*Primary Examiner* — Andrea L Wellington
*Assistant Examiner* — Fernando A Ayala
(74) *Attorney, Agent, or Firm* — Blank Rome LLP

(57) ABSTRACT

A hydrodynamic compression tool (1) comprises a motor (6) which actuates a hydrodynamic group (11) suitable to increase the pressure of a hydraulic fluid acting on an actuation piston (12) connected to jaws (13, 14), an electronic control system (9) connected to the electric motor (6) and to a user operating member (7) for the actuation of the electric motor (6) wherein the control system (9) monitors the reaching of a closed position of the jaws (13, 14) and switches off the motor (6) automatically upon reaching the closed position.

11 Claims, 7 Drawing Sheets

(51) Int. Cl.
*B25B 27/02* (2006.01)
*B25B 27/10* (2006.01)
*B25B 27/14* (2006.01)
*B23D 29/00* (2006.01)
*H01R 43/042* (2006.01)

(52) U.S. Cl.
CPC ............ *B25B 27/026* (2013.01); *B25B 27/10* (2013.01); *B25B 27/146* (2013.01); *H01R 43/0428* (2013.01)

(56) References Cited

U.S. PATENT DOCUMENTS

| | | | |
|---|---|---|---|
| 6,457,338 | B1 | 10/2002 | Frenken |
| 7,841,223 | B2 * | 11/2010 | Rollins .................. B25B 27/10 29/751 |
| 8,365,840 | B2 | 2/2013 | Sinnerstad et al. |
| 2003/0079513 | A1 * | 5/2003 | Miyamoto ......... H01R 43/0427 72/19.9 |
| 2003/0230131 | A1 | 12/2003 | Bowles et al. |
| 2005/0224131 | A1 | 10/2005 | Ishii et al. |
| 2011/0247506 | A1 | 10/2011 | Frenken |
| 2012/0053858 | A1 * | 3/2012 | Rollmann ................ G01N 3/32 702/42 |
| 2014/0044146 | A1 * | 2/2014 | Harrison ................ G01N 25/72 374/4 |

FOREIGN PATENT DOCUMENTS

| | | |
|---|---|---|
| EP | 2826603 A1 | 1/2015 |
| JP | 5-101864 A | 4/1993 |
| JP | 9-38845 A | 2/1997 |
| JP | 2003-136421 A | 5/2003 |
| JP | 2003-267307 A | 9/2003 |
| JP | 2004-330347 A | 11/2004 |
| JP | 2005-22052 A | 1/2005 |
| JP | 2010-523858 A | 7/2010 |
| JP | 2011-208534 A | 10/2011 |
| JP | 2013-188824 A | 9/2013 |

* cited by examiner

METHOD OF OPERATING A HYDRODYNAMIC COMPRESSION TOOL AND HYDRODYNAMIC COMPRESSION TOOL

The present invention relates to a method for operating a hydrodynamic compression and/or cutting tool as well as a hydrodynamic compression tool configured to implement such method.

To perform specific connection operations, such as the compression of connectors around electrical cables or hydraulic pipes, the compression of rivets, or cutting operations, such as cutting electrical cables during the installation and maintenance of electrical installations, hydrodynamic compression and/or cutting tools are often used.

Such tools usually comprise an electric motor powered by a battery and a hydraulic pump which causes an increase in pressure of a hydraulic fluid acting on a piston to move the latter against the force of a pressure spring. The piston is in turn connected to a movable jaw so as to move it during the compression operation, towards a fixed jaw of the tool. The jaws can be shaped and/or fitted with interchangeable accessories in such a way as to adapt it to a particular object, e.g. an electrical contact to be compressed or a metal bar to be cut.

Since compression tools are used very often in outdoor environments, such as along railway lines remote from buildings with a connection to the mains electricity, they need their own electrical power source, namely a portable storage battery built into or applied to the tool. Such battery provides a limited amount of electrical energy which determines its autonomy, i.e. the number of compression/cutting operations which can be performed by the tool without having to replace the battery. A further requirement is due to the fact that most of the time compression operations, in particular those aimed at making connections between connectors and/or electrical cables are hampered by extremely restricted space conditions, such as in an electrical cabin or on an electrical wiring line that combines a large number of cables very close together. It is therefore essential for compression tools to be a compact size. A third requirement is to be able to perform the compression and cutting operations with appropriate speed in order to reduce the time required to perform the work. A fourth requirement not met so far is to increase the fatigue life of the mechanical components of the tool, despite their small size and cyclical stresses.

The purpose of the present invention is therefore to provide a method of operating a hydrodynamic compression tool and a hydrodynamic compression tool with characteristics such as to overcome the problems mentioned with reference to the prior art.

One particular purpose of the invention is to provide a method and a hydrodynamic compression tool which allows an adjustment of the maximum compression force, electrical power absorption and duration of the hydrodynamic pressure to the size and compression-resistance of an object to be compressed.

In the context of the present invention, the inventors have considered that the compression tools of the prior art, in order to ensure completion of the compression of electrical or hydraulic connectors and to prevent damage due to excessive stress, end the compression phase upon reaching a maximum calibration force, for example of 60 kN. This is achieved for example either by a pressure relief valve connected to the hydrodynamic group and calibrated in such a way as to limit the hydraulic pressure acting on the piston to a maximum pressure which corresponds to the maximum calibration force.

The user thus has the certainty of always having applied a sufficient force to complete the compression of electrical or hydraulic connectors, regardless of their size or resistance to compression. In fact, the compression tool is usually designed to be able to compress connectors of a predetermined size range, e.g. connectors for electric cables with transversal cross-sections from 6 $mm^2$ to 240 $mm^2$, and the maximum calibration force is set to compress the largest size connector.

If the compression tool is used as a cutting tool, the termination of the compression phase upon reaching the maximum calibration force protects the mechanical components of the tool from damage due to excessive stress.

However, except for very rare cases, compression tools are used to compress very different sized connectors and very often smaller than the maximum size for which it is necessary to apply the maximum calibration force.

As a result, after the complete compression of a small connector, the jaws of the tool are tightened against each other until the maximum calibration force is reached which determines the end of the compression cycle. Such further stress of the jaws does not contribute to the compression of the connector but instead entails a peak power absorption and mechanical stress, the reduction of which is the starting point for achieving the objectives of the invention.

A method for operating a hydrodynamic compression tool is thus proposed, said tool comprising:
  an electric motor powered by a battery or from the mains;
  a hydrodynamic group operable by the electric motor and suitable to implement, in response to the movement of the motor, an increase in pressure of a hydraulic fluid acting on an actuation piston to move the actuation piston;
  two jaws connected to the housing so as to be reciprocally mobile, of which at least one mobile jaw is connected to the actuation piston so that, in response to the movement of the actuation piston, the jaws perform a relative movement between an open position and a closed position to perform the compression or cutting,
wherein in the open position the jaws are spaced apart so as to accommodate the object to be compressed or to be cut and, in the closed position, the jaws are moved in close approximation until getting in direct contact (in particular against each other) such as to prevent a further approximation towards each other,
wherein the method comprises the steps of:
  approximating the jaws towards each other by actuating the electric motor,
  monitoring the reaching of the closed position by means of a sensor,
  interrupting the actuation of the electric motor depending on a sensor signal which confirms that the closed position has been reached.

This way it is possible to stop the electric motor and the pressurisation of the hydraulic fluid upon completion of the compression of an object, e.g. an electric or hydraulic connector, without continuing the compression cycle until the maximum calibration force has been reached, thereby saving electric energy and reducing the peak stress of the mechanical components of the tool.

Hence, an increased fatigue life duration, an increase in the number of compressions which can be performed with one recharging of the battery, a reduction of the time needed to complete the single compression or cutting, and a possible reduction in the size of the mechanical components of the tool for the same fatigue life is achieved.

The purpose of the invention is also achieved by a hydrodynamic compression tool, comprising:
- an electric motor powered by a battery or from the mains,
- a hydrodynamic group operable by the electric motor and suitable, in response to the movement of the motor, to increase the pressure of a hydraulic fluid acting on an actuation piston to move the actuation piston;
- two jaws connected to the housing so as to be reciprocally mobile, of which at least one mobile jaw is connected to the actuation piston so that, in response to the movement of the actuation piston, the jaws perform a relative movement between an open position and a closed position to perform the compression or cutting, wherein in the open position the jaws are spaced apart so as to be able to accommodate the object to be compressed or to be cut and, in the closed position, the jaws are approximated towards each other until getting in direct contact (in particular against each other) such as to prevent a further mutual approximation thereof,
- an electronic control system connected to the electric motor and with a user operating mechanism (push-button) to operate the electric motor, characterised in that the control system comprises a monitoring device which monitors reaching of the closed position and, upon achievement of the closed position, generates a confirmation signal, and in that the control system interrupts the actuation of the electric motor automatically in dependency from the confirmation signal that the closed position has been reached.

For a clearer understanding of the invention and its advantages some of its embodiments, made by way of non-limiting examples, will be described below with reference to the appended drawings, wherein.

Figure 1:
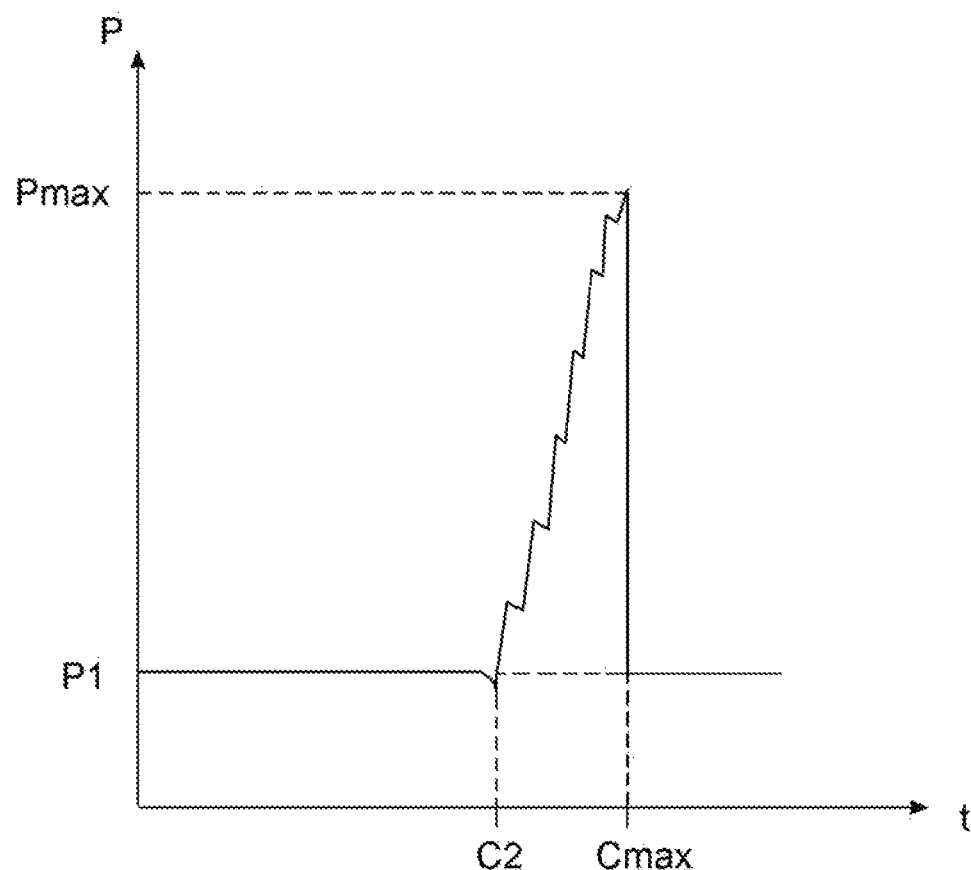
FIG. 1 is a pressure-time (or pressure-number of pump cycles) diagram of an "idle" compression (no object to be compressed inserted between the jaws) of a compression tool of the prior art with limitation of the pressure by means of a maximum pressure relief valve which switches when it reaches the maximum calibration pressure Pmax.
Figure 2:
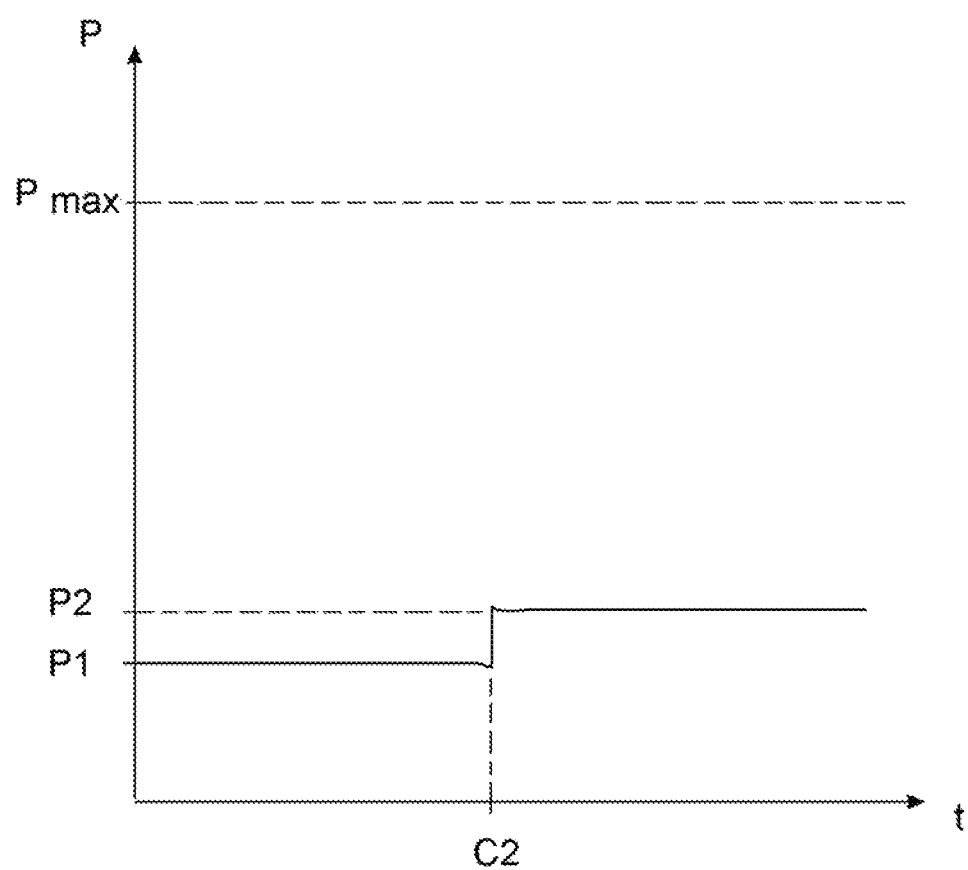
FIG. 2 is a pressure-time (or pressure-number of pump cycles) diagram of an "idle" compression (no object to be compressed inserted between the jaws) of a compression tool according to the invention which implements the method of the invention.
Figure 3:
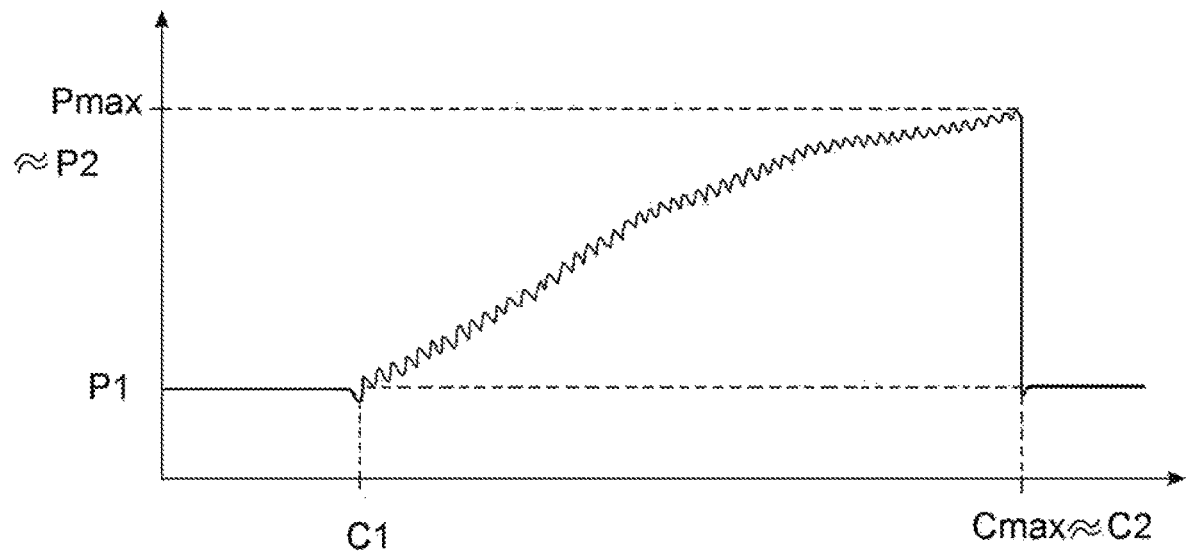
FIG. 3 is a pressure-time (or pressure-number of pump cycles) diagram of the compression of a connector or object of large dimensions which requires nearly the maximum calibration force, using a compression tool of the prior art with limitation of the pressure by means of a maximum pressure relief valve which switches when it reaches the maximum calibration pressure Pmax.
Figure 4:
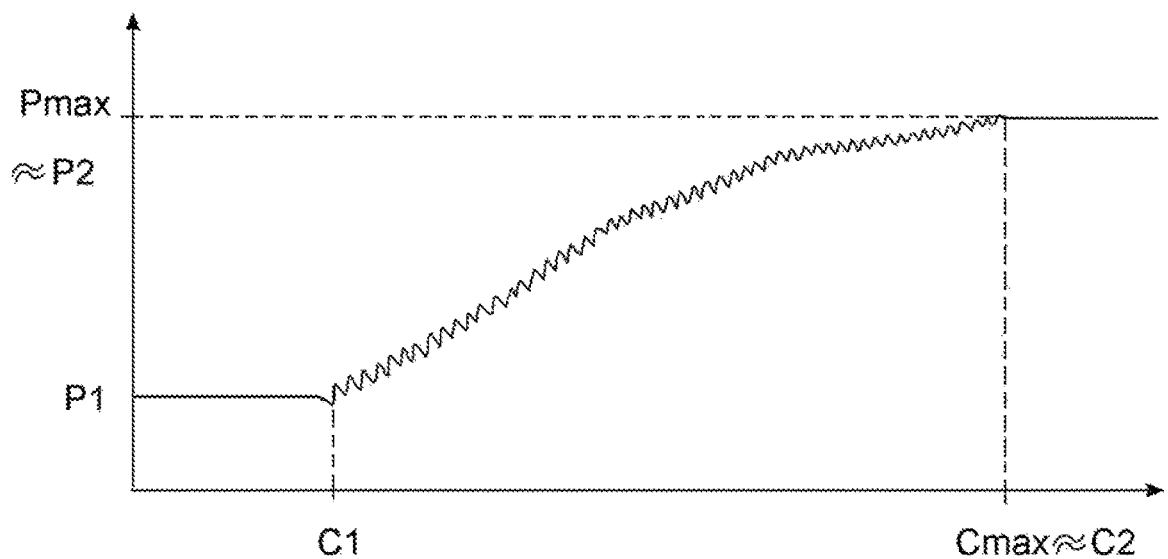
FIG. 4 is a pressure-time (or pressure-number of pump cycles) diagram of the compression of a connector or object of very large dimensions which requires practically the maximum calibration force, using a compression tool according to the invention that implements the method of the invention.
Figure 5:
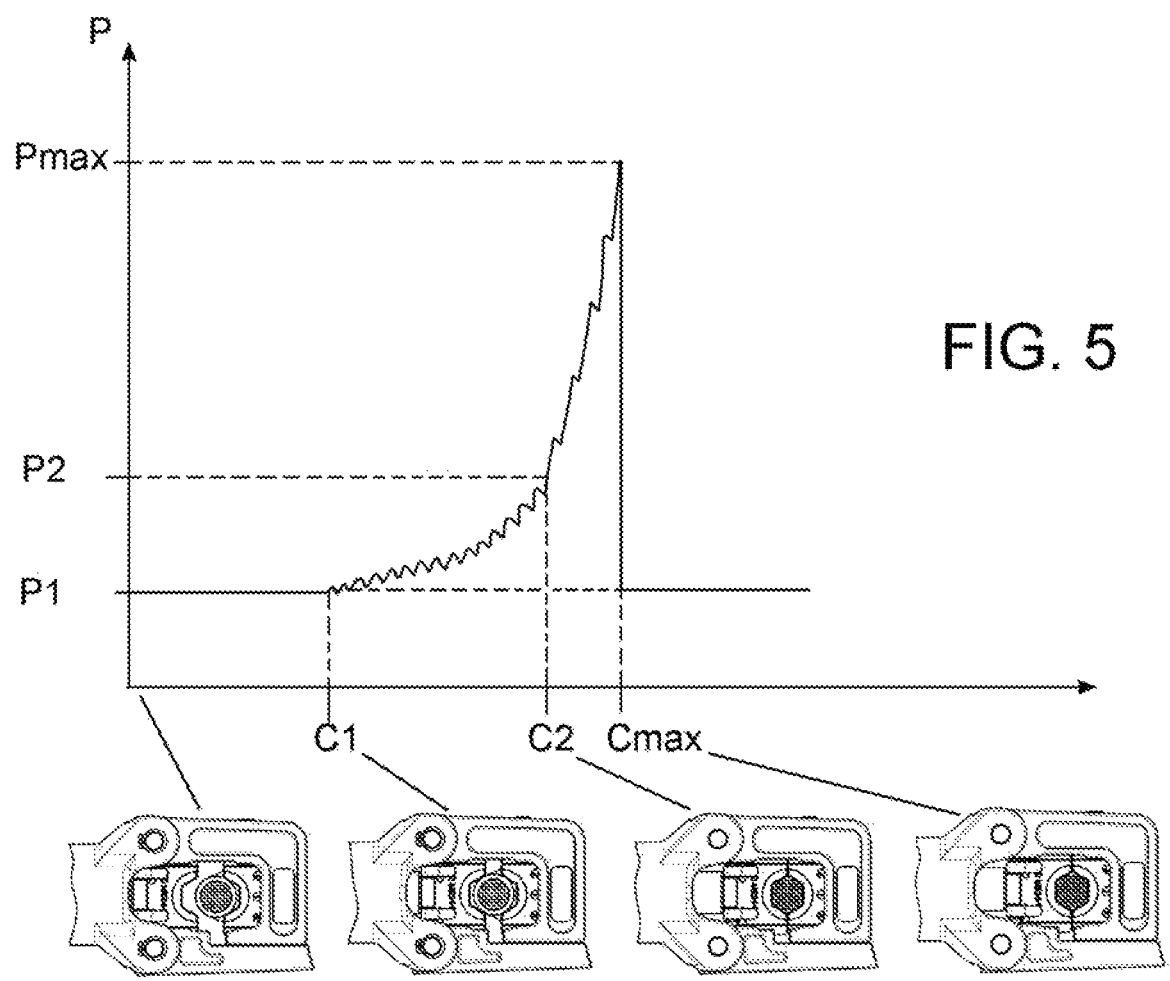
FIG. 5 is a pressure-time (or pressure-number of pump cycles) diagram of the compression of an object of small-medium dimensions which does not require the maximum calibration force, by means of a compression tool of the prior art with limitation of the pressure using a pressure relief valve which switches when it reaches the maximum calibration pressure Pmax.
Figure 6:
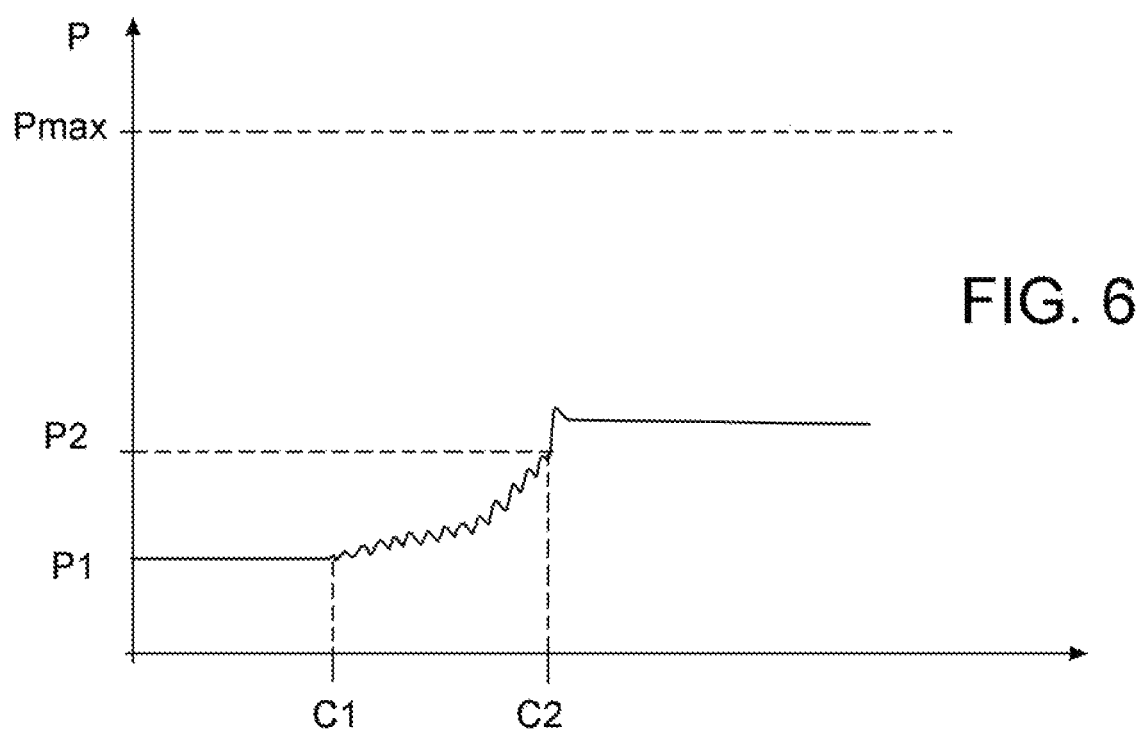
FIG. 6 is a pressure-time (or pressure-number of pump cycles) diagram of the compression of an object of small-medium dimensions which does not require the maximum calibration force, using a compression tool according to the invention that implements the method of the invention.
Figures 7, 7A:
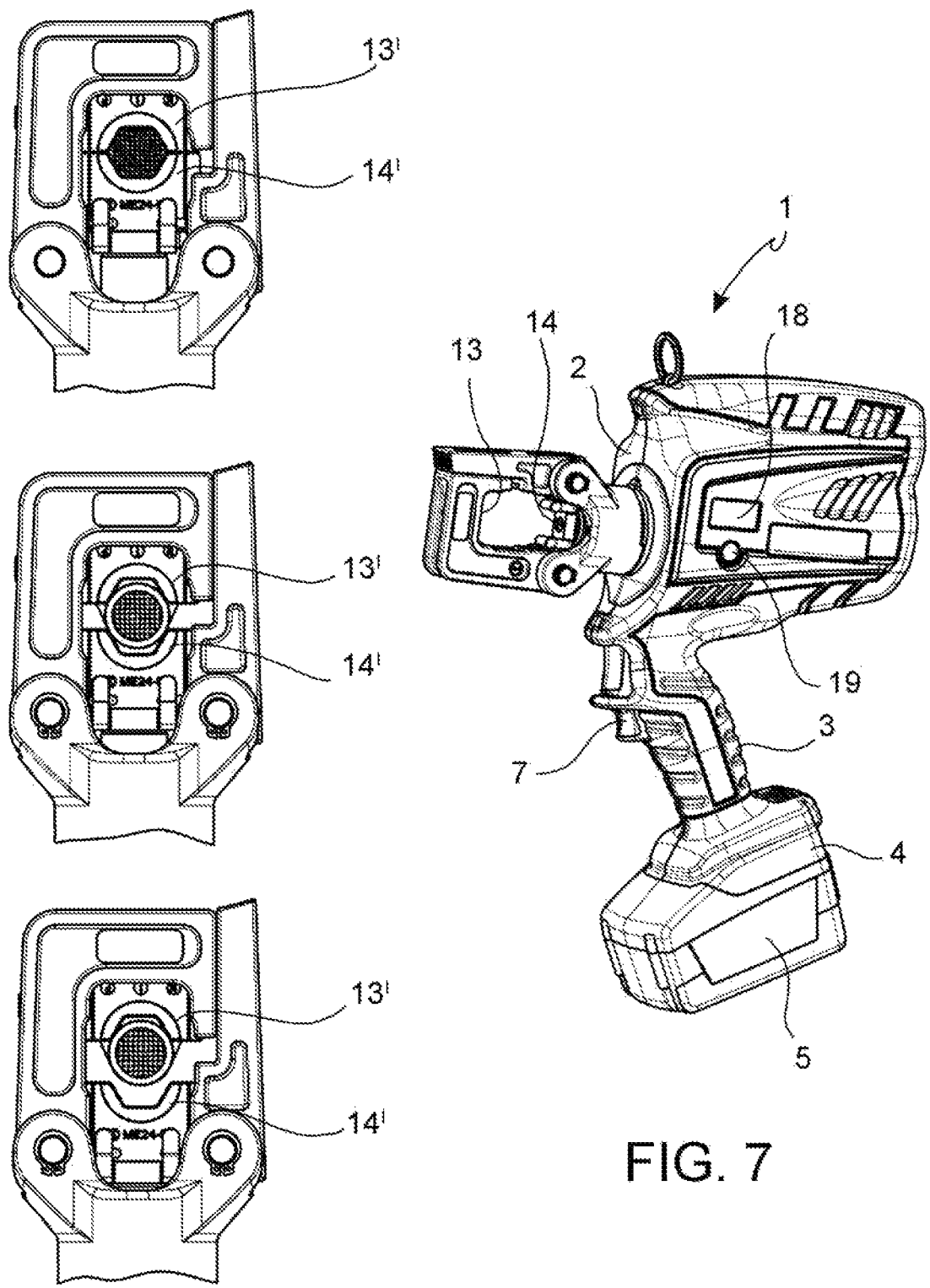
FIG. 7 is a perspective view of an electrohydraulic compression or cutting tool according to an embodiment of the invention, fitted with a compression head suitable to receive inserts or interchangeable jaw dies.
FIG. 7A shows a sequence of movement of the compression head of the tool shown in FIG. 7.
Figure 8:
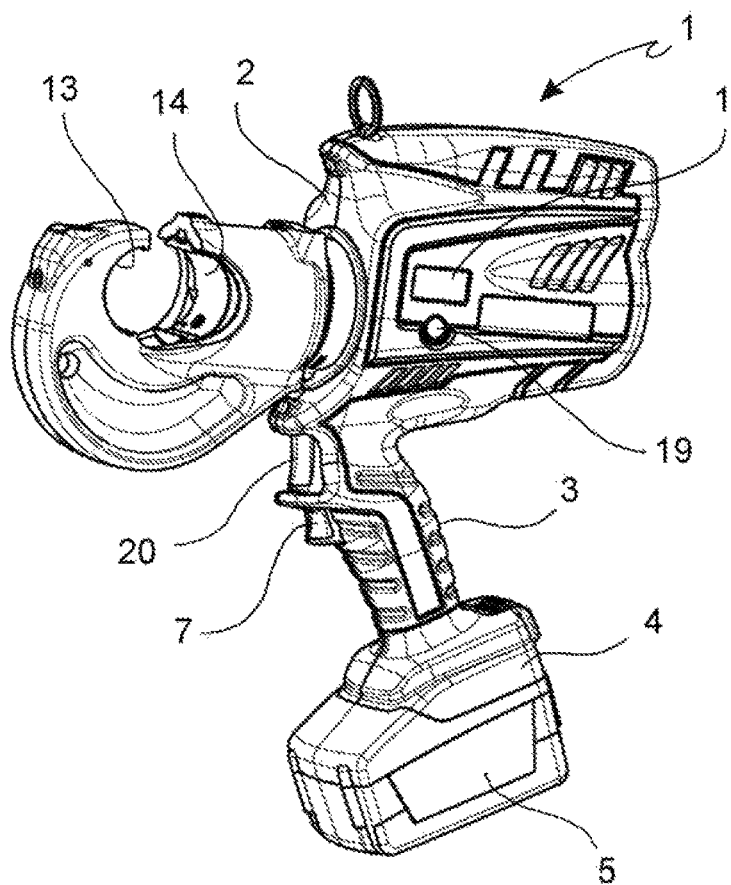
FIGS. 8 and 9 show hydrodynamic compression tools according to embodiments of the invention fitted with translatable or rotatable jaws for the compression of electrical and/or hydraulic connectors.
Figure 9:
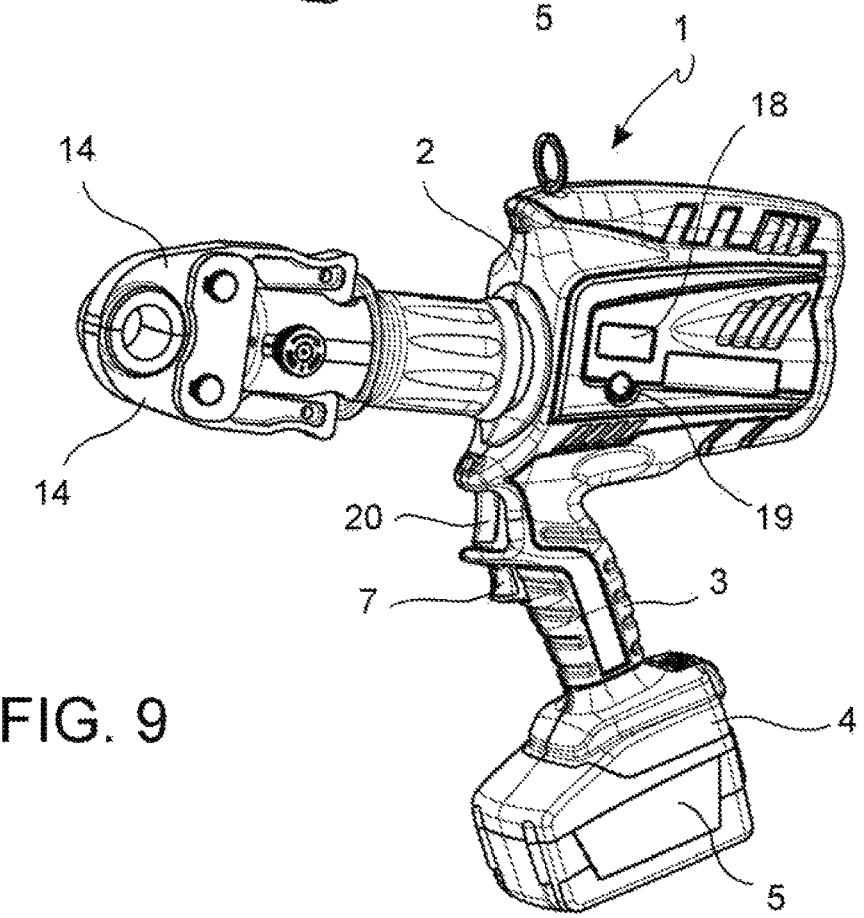

With reference to FIGS. 7-12, a hydrodynamic compression tool and/or cutting tool is globally denoted by reference numeral 1. The tool 1 comprises a housing 2 with a grip shaped portion 3 and a coupling portion 4 for the (preferably snap-) connection of a replaceable and rechargeable storage battery 5. The housing 2 houses an electric motor 6 powered by the storage battery 5 via a power supply and control circuit fitted with a switch on which acts a manual actuation pushbutton 7 placed in proximity of the handle 3.

A transformation mechanism 8, such as a crankshaft or cam shaft, is placed in the housing 2 and connected to the drive shaft of the motor 6 so as to transform the rotary movement of the drive shaft into cyclical or reciprocating movement, for example translational. A hydraulic pump 11, also housed in the housing 2, is connected to the transformation mechanism 8 and is suitable, in response to the cyclical or reciprocating movement of the transformation mechanism 8, to increase the pressure of a pressure fluid acting on an actuation piston 12 so as to move the actuation piston 12 along a piston stroke.

The tool 1 further comprises a fixed jaw 13 rigidly connected to the housing 2 and placed at a front end of the tool, as well as a mobile jaw 14 supported in the housing so as to be able to slide in relation to the fixed jaw 13. The mobile jaw 14 is connected to the actuation piston 12 so that, in response to the movement of the actuation piston 12, it is moved towards the fixed jaw 13 from an open position to a closed position, to perform the or compression or cutting operation.

In the open position the jaws 13, 14 are spaced apart to accommodate the object to be compressed or cut and, in the closed position, the jaws 13, 14 are moved close together and in direct contact (in particular abutting against each other) such as to prevent a approximating movement thereof.

A return spring 15 acts between the fixed jaw and the actuation piston 12, so as to urge the latter elastically into the rest position and the mobile jaw 14 into the open position away from the fixed jaw 13.

According to one embodiment, the hydraulic pump 11 comprises a tank 16, a cylinder-pumping piston group, a cylinder-actuation piston group and a pressure relief valve 17.

The cylinder-pumping piston group may comprise a pumping cylinder with a suction opening connected to the tank 16 by means of a check valve that allows the flow of hydraulic oil from the tank into the pumping cylinder 16 and an output opening connected to an actuation cylinder 10 of the cylinder-actuation piston group by means of a check valve that allows the flow of hydraulic oil from the pumping cylinder into the actuation cylinder 10. In the pumping cylinder a pumping piston may be housed coupled so as to move together with an oscillating body (for example an elbow portion) of the transformation mechanism 8.

The cylinder-actuation piston group comprises the actuation piston 12 connected to the mobile jaw 14 and placed in the actuation cylinder 10.

Figure 10:
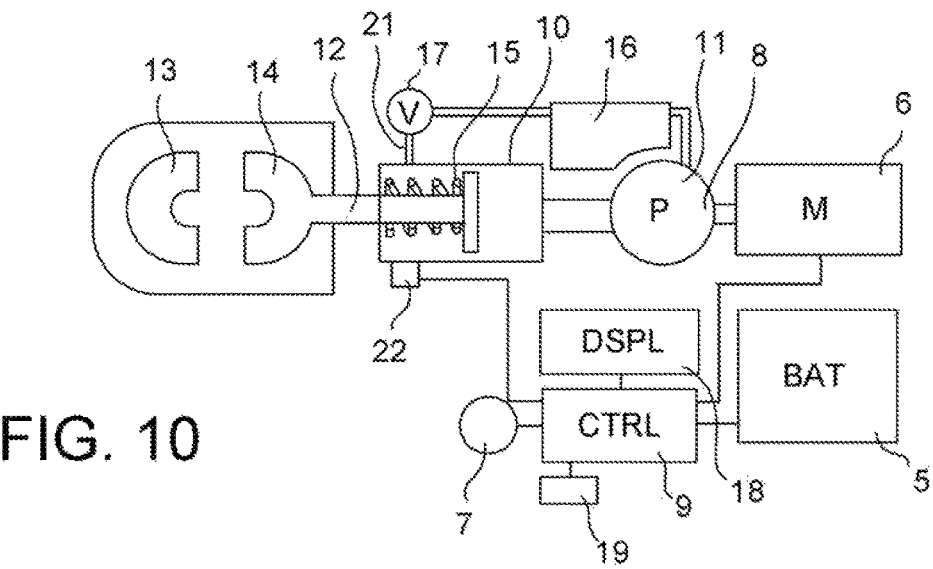
FIGS. 10, 11, 12 are schematic diagrams of hydrodynamic compression tools and their control systems according to embodiments of the invention.
Figure 11:
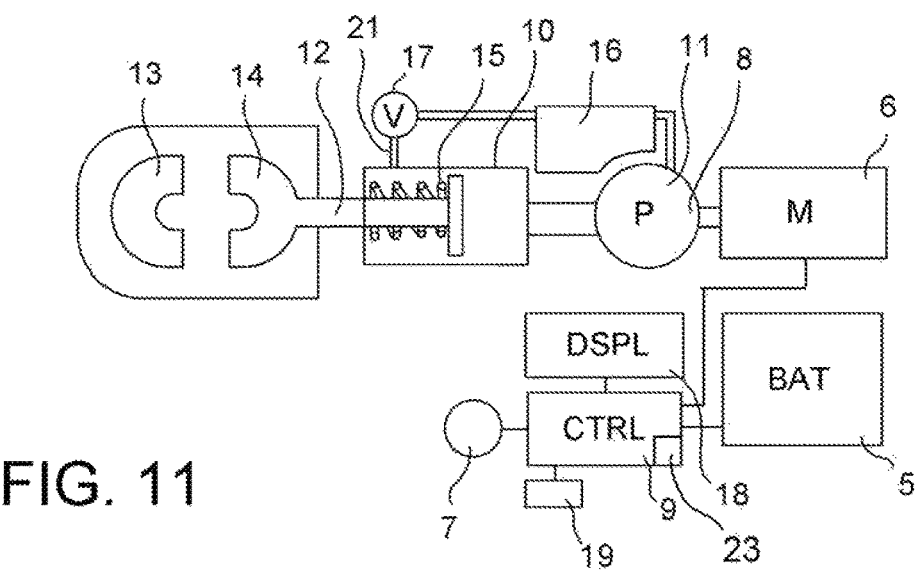
Figure 12:
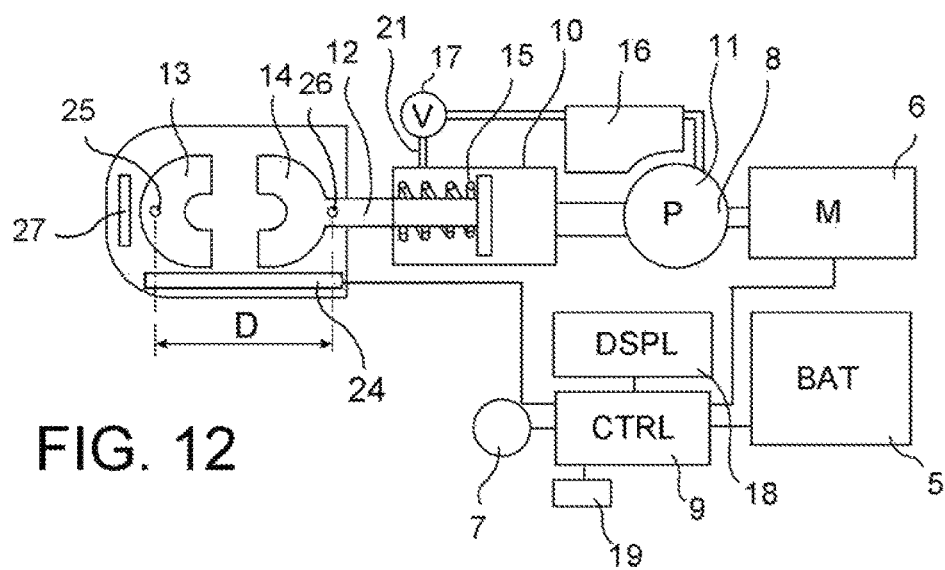

The pressure relief valve 17 is placed in a return duct for the fluid which return duct connects the actuation cylinder 10 to the tank 16 (FIGS. 10, 11, 12).

This way, the reciprocating translatory movement of the transformation mechanism 8 generated by the rotating movement of the drive shaft causes an oscillating translatory movement of the pumping piston which pumps the pressure liquid from the tank 16 into the actuation cylinder 10 to move the actuation piston 12 forward and, together therewith, the mobile jaw 14 from the open position to the closed position until the actuation cylinder 10 reaches a predetermined maximum calibration pressure. Upon reaching the maximum calibration pressure, the pressure relief valve 17 automatically opens the return duct 21 of the fluid to drain the pressure liquid from the actuation cylinder 10 into the tank 16.

According to one aspect of the invention, the method of operating the tool 1 comprises the steps of:
- moving the jaws 13, 14 towards each other by actuating the electric motor 6
- monitoring the reaching of the closed position using a sensor 22, 23, 24 and an electronic control circuit 9 connected to the sensor 22, 23, 24 and to the electric motor 6,
- interrupting the actuation of the electric motor 6 depending on a signal by sensor 22, 23, 24 which confirms that the closed position of the jaws 13, 14 has been reached.

According to one embodiment (FIG. 10), the monitoring of the reaching the closed position comprises:
- detecting at predetermined time intervals (or predetermined intervals of the pumping cycles of the hydraulic pump 11) the pressure of the hydraulic fluid acting on the actuation piston 12, using a pressure sensor 22 connected to the electronic control circuit 9,
- using the electronic control circuit 9, calculating a pressure difference measured at the beginning and at the end of each of said predetermined time intervals (or predetermined intervals of the pumping cycles) and comparing the calculated pressure difference with an reference value indicative for the closed position of the jaws 13, 14.

The increase in pressure per unit of time $\Delta p/\Delta t$ or per pumping cycle $\Delta p/n_p$ is indicative of the derivative of the pressure function $p=f(t)$ over time with the hydraulic pump 11 switched on and, therefore, the rigidity countering a further movement towards each other of the jaws 13, 14, and the reference value of $\Delta p\_ref/\Delta t$ represents the rigidity of the system when the jaws 13, 14 are in direct contact with each other and any further approximation movement thereof is prevented.

According to a further embodiment (FIG. 11), the monitoring of reaching the closed position comprises:
- detecting at predetermined time intervals $\Delta t$ (or at predetermined intervals of the pumping cycles $n_p$) an electrical quantity indicative for the power absorbed by the motor, using an electric sensor 23 connected to the electronic control circuit 9,
- using the electronic control circuit 9, calculating a difference between the electrical quantity measured at the beginning and at the end of each of said predetermined time intervals $\Delta t$ (or predetermined intervals of the pumping cycles $n_p$) and comparing the difference of the calculated electrical quantity with a reference value indicative for the closed position of the jaws 13, 14.

For example, in the case of a direct current motor 6 with known impedance, the electric current I absorbed by the motor 6 can be used as an electrical quantity indicative of the power absorbed by the motor 6 and measured using a current sensor 23.

In this case, the change in the power absorbed by the motor 6 per unit of time $\Delta t$, or per pumping cycle $n_p$ indicates the stiffness opposing a further approximation movement of the jaws 13, 14 and the reference value represents the stiffness of the system when the jaws 13, 14 are in direct contact with each other and prevent any further movement towards each other.

According to a further embodiment (FIG. 12), the monitoring of reaching the closed position comprises:
- detecting at predetermined time intervals $\Delta t$ (or at predetermined intervals of pumping cycles $n_p$) a distance D between two reference points 25, 26, of the two jaws 13, 14, using a distance sensor 24, such as an optical sensor or a linear transducer, connected to the electronic control circuit 9,
- using the electronic control circuit 9, calculating a difference $\Delta D$ of the distance D measured at the beginning and at the end of each of said predetermined time intervals $\Delta t$ (or predetermined intervals of the pumping cycles $n_p$) and comparing the calculated difference of the distance D with a reference value $\Delta Dref$ indicative for the closed position of the jaws 13, 14.

In this case, the change $\Delta D$ in the distance D between the two reference points 25, 26 per unit of time $\Delta t$, or per pumping cycle $n_p$ indicates in inverse relation the stiffness opposing a further movement towards each other of the jaws 13, 14 and the reference value $\Delta Dref$ represents the stiffness of the system when the jaws 13, 14 are in direct contact with each other and prevent any further movement towards each other.

According to a further embodiment of the invention (FIG. 12), the monitoring of reaching the closed position comprises:
- detecting at predetermined time intervals $\Delta t$ (or at predetermined intervals of pumping cycles $n_p$) a distance D between two reference points 25, 26, of the two jaws, 13 14, using a distance sensor 24, such as an optical sensor or a linear transducer, connected to the electronic control circuit 9,
- using the electronic control circuit 9, comparing the measured distance D with a reference value Dref indicative for the closed position of the jaws 13, 14.

In this case, the monitoring of reaching the closed position does not take place by monitoring the structural response of the tool 1 to the pumping of hydraulic fluid, but directly.

In this embodiment steps may also be provided for the identification of a jaw type or die or insert type for interchangeable jaws (to adapt the tool 1 to the shape of the object to be compressed or cut) and to determine the reference value according to the type of jaw or type of jaw insert identified.

This step of the method may be performed automatically, for example by means of an identification detector 27 connected to the control circuit 9 and suitable to detect an identifying feature of the jaws 13, 14 or of the inserts for jaws 13', 14' (FIG. 7A), for example:

a shape feature of a mechanical interface of the jaw or the insert, an optical or chromatic feature of an optical interface of the jaw or the insert, a magnetic feature of a magnetic interface of the jaw or the insert, an electrical feature of an electric interface of the jaw or the insert, a signal of a radio frequency identification tag (RFID tags) of the jaw or the insert, and subsequent determination of the reference value Dref according to the identified type of jaw or jaw insert.

Similarly, provision may be made to identify the type of the object to compress or cut and possibly to perform switching off of the electric motor or other functions of the tool at least also depending on the type of object identified.

For the identification of the object to be compressed or cut an object identification detector may be provided for which can be created and configured as the identification detector 27 described above. Alternatively, the object identification detector may comprise a position sensor configured to detect a position of the actuation piston, wherein the electronic control circuit is in signal connection with the pressure sensor, with the position sensor and with the electric motor, and configured to identify an object engaged by the jaws (13, 14) depending on the hydraulic fluid pressure detected by the pressure sensor and on the position of the actuation piston detected by the position sensor during actuation of the electric motor. Such identification of the object may take place automatically for example by means of the following steps:

identifying, on the basis of the monitored pressure, an engagement moment in which the jaws engage the object placed between them and in which the compression of the object commences, detecting a compression starting position of the actuation piston at the moment of engagement, identifying the object engaged by the jaws depending on the detected compression starting position.

According to a further embodiment (not shown), the monitoring of reaching the closed position comprises:

placing a switch, e.g. electrical or optical, at the jaws 13, 14 so that the reaching the closed position due to an approximation movement of the jaws 13, 14 causes a determined switching process of the switch, detecting said switching process by means of the control circuit 9 connected to the switch.

Advantageously, the step of monitoring the reaching the closed position is carried out automatically and the electronic control circuit 9 automatically switches off the electric motor 6 when the closed position of the jaws 13, 14 is reached.

FIGS. 1 to 6 show the technical effect of the method of operating the compression tool 1 compared to the prior art.

In the case of an "idle" compression of a tool of the prior art (FIG. 1), during the approximation movement of the jaws an initial pressure P1 occurs required to overcome the friction, inertia and (if provided for) the elastic return force of a return spring acting on the piston. After the jaws or jaw dies reach the closed position and come into contact with each other, in the moment C2 shown on the t-axis, the hydraulic oil pressure acting on the piston rises rapidly and each step of the gradient ramp represents a pump cycle. If the compression head of the tool and the mechanical connections with the hydrodynamic group were infinitely rigid, the pressure would rise vertically up to infinity at the first pump cycle after reaching the closed position of the jaws. The pressure increase of the hydraulic fluid stops when it reaches the maximum pressure Pmax in response to the opening of the maximum pressure relief valve connected to the cylinder of the hydrodynamic group, in the moment Cmax indicated on the t-axis. The area under the curve p between the points C2 and Cmax on the t-axis represents the mechanical work performed and the electric energy needlessly dissipated after reaching the closed position of the jaws until the pressure relief valve trips.

In the case of an "idle" compression of a tool according to the invention which implements the method of the invention (FIG. 2), during the approximation movement of the jaws the above initial pressure P1 occurs. After the jaws or jaw dies reach the closed position and come into contact with each other, as indicated on the t-axis in the moment C2, the hydraulic oil pressure acting on the piston starts to rise rapidly only until the electric motor and hydraulic pump are turned off in response to the signal confirming that the closed position has been reached. Consequently, the pressure increase of the hydraulic fluid stops long before reaching the maximum pressure Pmax, thereby significantly reducing the electric energy consumption for the completion of the compression and the peak mechanical stress of the compression head of the tool 1.

In the case of compression of a connector or an object having very large dimensions which requires almost the maximum calibration force, using a tool of the prior art (FIG. 3), during the approximation movement of the jaws the above initial pressure P1 occurs. After the jaws or jaw inserts reach and engage the object to be compressed, in the moment C1 indicated on the t-axis, the hydraulic oil pressure acting on the piston rises moderately initially because of the plastic yielding of the object. Gradually as the object is compressed and its stiffness increases, the pressure increase at every pump cycle increases until the maximum calibration pressure is reached which occurs approximately coinciding with the reaching of the closed position of the jaws, in the moment C2 indicated on the t-axis. The pressure increase of the hydraulic fluid stops when it reaches the maximum pressure Pmax and the pressure falls in response to the opening of the pressure relief valve connected to the cylinder of the hydrodynamic group, in the moment Cmax indicated on the t-axis In the case of compression of a connector or object of very large dimensions that requires almost the maximum calibration force, using the tool according to the invention (FIG. 4), the time—pressure trend, up to the intervention of the pressure sensor (Cmax), is almost identical to that shown in FIG. 3, since the compression tool must apply the maximum force available and, in this situation, there are no margins for savings of electric energy or for a reduction of the peak stress of the mechanical components of the tool.

Depending on the ratio of the maximum calibration force and the force actually required to reach the closed position of the jaws, the termination of the compression cycle occurs in this case through the switching of the pressure relief valve or through electrical motor shutdown in response to the confirmation signal of the closed position having been reached and specifically through the first of the two events to occur.

In the case of compression of an object that does not require the maximum calibration force, using a tool of the prior art (FIG. 5), during the approximation movement of the jaws the above initial pressure P1 occurs. After the jaws or jaw inserts reach and engage the object to be compressed, in the moment C1 indicated on the t-axis, the hydraulic oil pressure acting on the piston rises moderately initially because of the plastic yielding of the object. Gradually as the object is compressed and its stiffness increases, the pressure increase at every pump cycle increases until the closed position of the jaws is reached, in which the jaws get into contact with each other, in the moment C2 indicated on the t-axis. At this point, the pressure of the hydraulic fluid acting on the piston rises rapidly and stops when it reaches the maximum pressure Pmax in response to the opening of the pressure relief valve connected to the cylinder of the hydrodynamic group, in the moment Cmax indicated on the t-axis. The area under the curve p between the points C2 and Cmax on the t-axis represents the mechanical work performed and the electric energy needlessly dissipated after reaching the closed position of the jaws until the pressure relief valve switches.

In the case of compression of an object that does not require the maximum calibration force, using a tool according to the invention which implements the method of the invention (FIG. 6), during the approximation movement of the jaws the above initial pressure P1 occurs. After the jaws or jaw inserts reach and engage the object to be compressed, in the moment C1 indicated on the t-axis, the hydraulic oil pressure acting on the piston rises moderately initially because of the plastic yielding of the object. Gradually as the object is compressed and its rigidity increases, the pressure increase at every pump cycle increases until the closed position, in which the jaws get in contact to each other, is reached, in the moment C2 indicated on the t-axis. At this point the hydraulic oil pressure acting on the piston starts to rise rapidly, due to the completion of the plastic deformation of the connector, only until shutdown of the electric motor, in response to the confirmation signal of the closed position having been reached. Consequently, the increase in pressure of the hydraulic fluid stops long before reaching the maximum pressure Pmax, significantly reducing the electric energy consumption and the peak mechanical stresses of the compression head of the tool.

For the implementation of the method described so far the compression or cutting tool 1 may comprise one or more of the aforesaid:
pressure sensors 22,
electrical quantity sensors, in particular current sensors 23,
distance sensors 24,
switches, e.g. electrical or optical,
sensors 27 for the identification of the jaws and/or jaw inserts,
devices for the identification of the object to be compressed or cut, connected to the electronic control circuit 9, forming together a monitoring device that monitors the reaching of the closed position of the jaws 13, 14 and which, upon reaching the closed position, generates the confirmation signal, and wherein the electronic control circuit 9 is configured to stop the actuation of the electric motor 6 automatically upon reaching the closed position and depending on the confirmation signal.

Depending on the embodiment, the sensor 22, 23, 24 on board the tool 1 is configured to perform the functions described above with reference to method and not repeated here for brevity's sake.

The electronic control circuit 9 is configured to process the signals coming from the sensor 22, 23, 24 and to control the electric motor 6 in accordance with the method described above.

The control circuit 9 comprises a processing unit (CPU), a memory (internal or external) associated with processing unit (CPU), a communication interface associated with the processing units (CPU) and suitable to receive signals (pressure, current, position, connector or insert types) from the sensor 22, 23, 24, 27 and to transmit control signals to the electric motor 6. The control circuit 9 further comprises a computer program loaded in the memory and configured to perform the processing of signals and the operations needed to implement the method of operating the tool 1. The control circuit 9 is connected to the battery 5 when the battery 5 is coupled to the tool 1, and could also have its own battery possibly suitable to be charged when the control circuit 9 is connected to the battery 5.

According to an embodiment, the tool 1 comprises a user interface 19, such as a keyboard, connected to the control circuit 9, which allows the user to select the function with automatic shutdown of the motor 6 upon reaching the closed position of the jaws 13, 14 or, alternatively, traditional operation reaching the maximum calibration pressure.

The tool 1 further comprises a display 18, for example LCD or LED, connected to the control circuit 9 which is configured to determine, by means of said display 18, a visualization of the selected operating mode, of an indicative value of a maximum reached compression force, as well as a confirmation of the outcome of the compression process.

According to one aspect of the invention, the method comprises a step of calculating (and possibly the display of) a residual number of compression or cutting cycles before a scheduled maintenance of the tool. Advantageously, the residual number of cycles is calculated depending on:
a predetermined initial residual number of cycles,
stress values that are representative for and variable depending on the mechanical stresses of the tool in the individual compression or cutting cycles.

In one embodiment, the stress values are representative of the maximum compression or cutting forces or for ranges of maximum compression or cutting forces, actually reached during each of the compression or cutting cycles, and the calculation of the residual number of cycles comprises, for each cycle out of a sequence of consecutive cycles:
the calculation of a reduction value depending on the stress value of the current cycle wherein said reduction value is a variable quantity from one cycle to another depending on the maximum compression or cutting forces actually reached in the individual cycles,
the calculation of the number of cycles remaining after the completion of the current cycle by subtracting the reduction value from a residual number of cycles calculated for the cycle prior to the current cycle.

The calculation of the residual number of cycles may comprise the calculation of a fraction of damage of at least one component of the tool (e.g. of the jaws) during each cycle depending on the stress value, for example using the following calculation method:

Step 1) Given the stress value pi reached in a given cycle, calculating the number of cycles Ni which a component of the tool (e.g. of the jaws) should perform to reach breaking point if it were stressed in each cycle with the stress value pi, e.g. using the formula $Ni = NR \cdot (pR/pi)^{i/k}$ where NR and pR is a pair of known values (in particular a maximum stress and the number of cycles leading to breakage, applying at each cycle a stress equal to the maximum stress; k is an experimental value indicative of fatigue resistance of the tool).

Step 2) Calculating the fraction of fatigue damage of the component in the cycle with stress pi, e.g. using the formula $1/\delta i = Ni$, Step 3) Calculating the reduction value, i.e. the number of adaptive cycles ni to subtract from the number of cycles until maintenance Nm e.g. using the formula $$Ni = \delta i \cdot NR$$

where NR is the number of cycles leading to breakage of the component when stressed in each cycle with the maximum stress pR.

Step 4) Calculating the number of cycles remaining until maintenance, e.g. using the formula $$Nm(i) = Nm(i-1) - ni$$

where Nm (i−1) represents the residual number of cycles until maintenance in the previous cycle, and Nm (i) represents the residual number of cycles until maintenance in the current cycle.

To reduce the computational complexity, a series of predetermined ranges for the stress values can be defined, with associated predetermined reduction values and used instead of the full calculation for determining the reduction value depending on the stress value.

The method described can be performed by the electronic control circuit 9 and the number of residual cycles can be shown for example by the display 18 and/or an acoustic or visual signal may be generated by the control circuit 9 by means of one or more signalling devices connected thereto.

The control circuit 9 detects the stress value for each cycle using one or more stress sensors, for example:

- by detecting the pressure of the hydraulic fluid acting on the actuation piston 12, using the pressure sensor 22 connected to the electronic control circuit 9. In this case the stress value is the maximum pressure of the hydraulic fluid detected in the cycle.
- detecting a force acting on the jaws, using a force sensor connected to the electronic control circuit 9. In this case the stress value is the maximum force detected in the cycle.
- detecting an indicative electrical quantity for the power absorbed by the motor, using an electrical sensor 23 connected to the electronic control circuit 9. In this case the stress value is the maximum electrical quantity (e.g. electrical power or current) absorbed by the motor in the cycle.

The functioning of the tool 1 will be described below.

By pressing the actuation button 7 a micro switch of the control circuit 9 is actuated, which starts the electric motor 6 and simultaneously begins to receive and process the signals indicative of the pressure of the hydraulic fluid detected by the pressure sensor 22. The control circuit 9 is configured so that the electric motor 6 remains switched on only with the actuation button 7 pressed and is thus automatically switched off with the release of said actuation button 7. When the jaws 13, 14 reach the closed position, the control circuit 9 automatically switches off the electric motor 6 before reaching the maximum calibration pressure that would result in the automatic opening of the pressure relief valve 17. Now the actuation button 7 can be released.

For the return of the actuation piston 12 to its rest position (jaws open), the tool 1 may comprise a member 20 for manual actuation or, alternatively, a means for automatic actuation of an outlet valve of the hydraulic fluid from the actuation cylinder into the tank.

Figure 13:
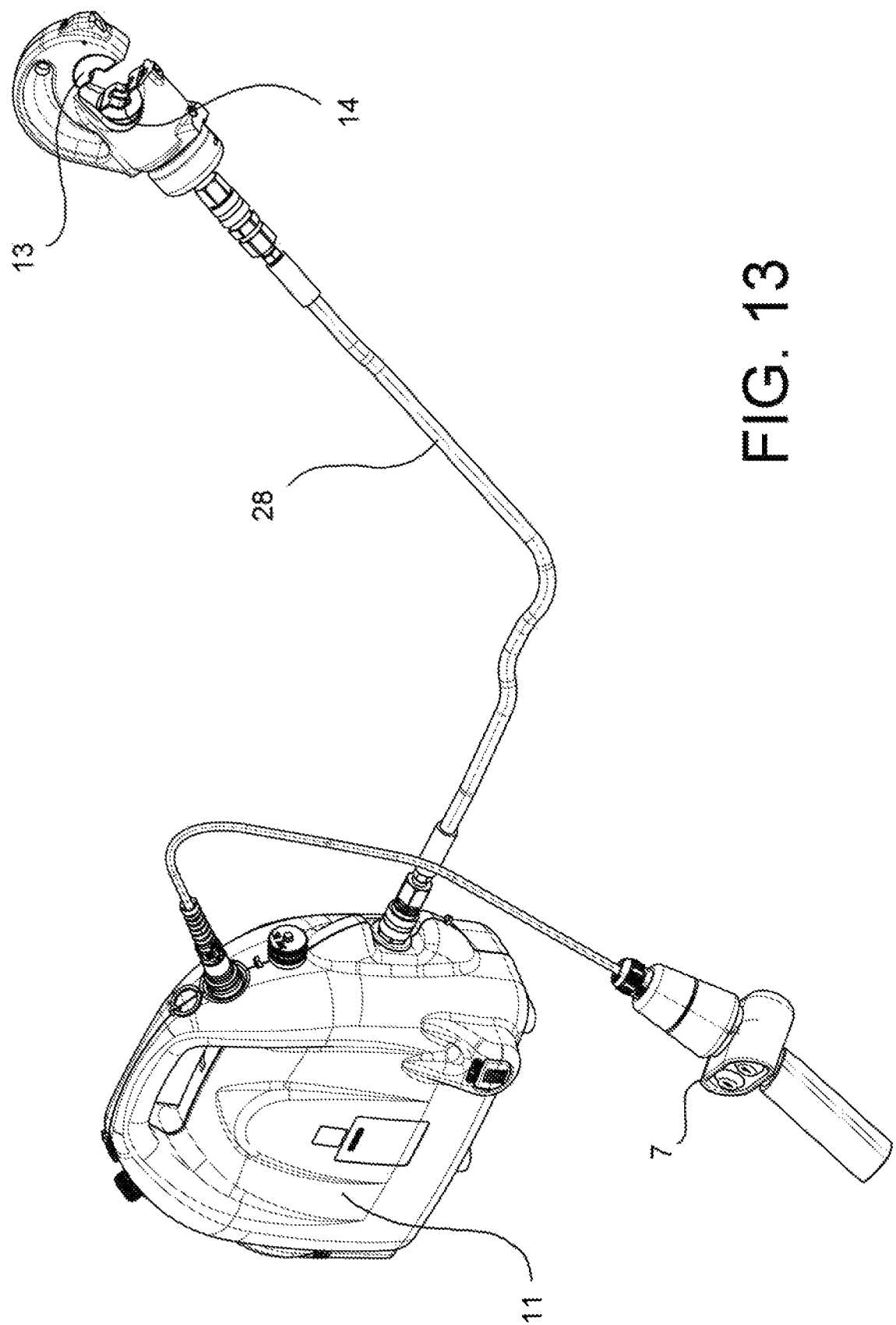
FIG. 13 shows a compression tool in which the compression head is distanced from the pumping group and connected to it by means of a flexible pressure hose.

The invention is applicable advantageously both to portable hydrodynamic compression and/or cutting devices with a single housing and to hydrodynamic compression and/or cutting devices in which the hydraulic pump 11 can be separated and distanced from the compression and/or cutting head (actuation piston 12, jaws) and connected to it by a flexible hose 28 for pressurised oil (FIG. 13).

Obviously, a person skilled in the art may make further modifications and variations to the compression and/or cutting tool according to the present invention so as to satisfy contingent and specific requirements while remaining within the scope of protection of the invention as defined by the following claims.

The invention claimed is:

1. Hydrodynamic compression or cutting tool, comprising:
   an electric motor adapted to be powered by a source of electricity,
   a hydrodynamic group operable by the electric motor and suitable to implement, in response to the movement of the motor, a pressure increase of a hydraulic fluid acting on an actuation piston to move the actuation piston,
   two jaws connected to the housing so as to be movable with respect to each other, of which at least one mobile jaw is connected to the actuation piston so that, in response to the movement of the actuation piston, the jaws perform a relative movement between an open position and a closed position to perform the compression or cutting,
   wherein in the open position the jaws are spaced apart to accommodate the object to be compressed or cut and, in the closed position, the jaws are moved towards each other and in direct contact such as to prevent a further approximation movement thereof, and
   an electronic control system connected to the electric motor and with a user operating member to operate the electric motor,
   wherein the electronic control system comprises:
      monitoring means which monitor the reaching of said closed position and which, on reaching the closed position, generate a confirmation signal,
      an electronic control circuit which stops the actuation of the electric motor automatically in dependency of the confirmation signal that the closed position has been reached, and
   processing means that calculate a residual number of compression or cutting cycles up to a scheduled maintenance of the tool, depending on:
      a predetermined initial residual number of cycles, and
      variable stress values representative for mechanical stresses of the tool in the individual compression or cutting cycles, wherein the mechanical stress values are representative of:
      the maximum compression or cutting forces or
      intervals of maximum compression or cutting force, actually reached during each compression or cutting cycle,
      and the calculation of the residual number of cycles comprises for each cycle out of a sequence of consecutive cycles:
         the calculation of a reduction value depending on the stress value of the current cycle, wherein said reduction value is a variable quantity from one cycle to another depending on the maximum compression or cutting forces actually reached in the individual cycles, and the calculation of the residual number of cycles remaining after the completion of the current cycle by subtracting the reduction value from a residual number of cycles calculated for the cycle prior to the current cycle.

2. Tool according to claim 1, wherein the monitoring means comprise a pressure sensor connected to the electronic control circuit, in which the pressure sensor detects the pressure of the hydraulic fluid acting on the actuation piston at predetermined time intervals or at predetermined intervals of pumping cycles of the hydrodynamic group, and wherein the electronic control system:
calculates a difference between the pressure detected at the beginning and at the end of each of said predetermined time intervals or predetermined intervals of pumping cycles, and compares the calculated pressure difference with a reference value indicative for the closed position of the jaws, switches off the electric motor depending on the result of the comparison between the calculated pressure difference and the reference value.

3. Tool according to claim 1, wherein the monitoring means comprise an electric sensor connected to the electronic control circuit, in which the electric sensor detects an electrical quantity indicative for the power absorbed by the motor at predetermined time intervals or at predetermined intervals of pumping cycles of the hydrodynamic group, and wherein the electronic control system:
calculates a difference between the electrical quantity detected at the beginning and at the end of each of said predetermined time intervals or predetermined intervals of pumping cycles, and compares the difference of the calculated electrical quantity with a reference value indicative for the closed position of the jaws and switches off the electric motor depending on the result of the comparison between the calculated electrical quantity and the reference value.

4. Tool according to claim 1, wherein the monitoring means comprise an electric sensor connected to the electronic control circuit, in which the electric sensor detects an electrical quantity indicative for the power absorbed by the motor at predetermined time intervals or at predetermined intervals of pumping cycles of the hydrodynamic group, and wherein the electronic control system:
compares the detected electrical quantity with a reference value indicative for the closed position of the jaws and switches off the electric motor depending on the result of the comparison between the detected electrical quantity and the reference value.

5. Tool according to claim 3, wherein said electrical sensor is a current sensor and said electrical quantity is the electric current absorbed by the motor.

6. Tool according to claim 1, wherein the monitoring means comprise a distance sensor connected to the electronic control circuit, in which the distance sensor detects a distance between two reference points of the two jaws at predetermined time intervals or at predetermined intervals of pumping cycles of the hydrodynamic group, and wherein the electronic control system:
calculates a difference between the distance detected at the beginning and at the end of each of said predetermined time intervals or predetermined intervals of pumping cycles, and compares the difference of the calculated distance with a reference value indicative for the closed position of the jaws and switches off the electric motor depending on the result of the comparison between the difference of the calculated distance and the reference value.

7. Tool according to claim 1, wherein the monitoring means comprise a distance sensor connected to the electronic control circuit, in which the distance sensor detects a distance between two reference points of the two jaws at predetermined time intervals or at predetermined intervals of pumping cycles of the hydrodynamic group, and wherein the electronic control system:
compares the detected distance with a reference value indicative for the closed position of the jaws and switches off the electric motor depending on the result of the comparison between the detected distance and the reference value.

8. Tool according to claim 6, wherein said distance sensor comprises an optical sensor or a linear transducer.

9. Tool according to claim 1, wherein the monitoring means comprise a switch connected to the electronic control circuit and positioned in such a way that the reaching of the closed position of the jaws causes a given switching process of the switch, in which the control circuit detects said switching process and turns off the electric motor in response to said switching process.

10. Tool according to claim 1, comprising an identification detector connected to the control circuit and suitable to detect an identifying feature:
of the jaws, or
of inserts housed in the jaws, or
of said object to be compressed or cut.

11. Method of operating a hydrodynamic compression tool, said tool comprising:
an electric motor adapted to be powered by a battery;
a hydrodynamic group operable by the electric motor and suitable to implement, in response to the movement of the motor, a pressure increase of a hydraulic fluid acting on an actuation piston to move the actuation piston;
two jaws connected to the housing so as to be movable relative to each other, of which at least one mobile jaw is connected to the actuation piston so that, in response to the movement of the actuation piston, the jaws perform a relative movement between an open position and a closed position to perform the compression or the cutting,
wherein in the open position the jaws are spaced apart to accommodate the object to be compressed or cut and, in the closed position, the jaws are moved close together in direct contact (or abutment) so as to prevent a further approximating movement thereof,
wherein said method comprises the steps of:
moving the jaws towards each other by actuating the electric motor,
monitoring the reaching of the closed position using a sensor and on reaching the closed position, generating a confirmation signal, and stopping the actuation of the electric motor depending on the confirmation signal when the closed position is reached, wherein said method further comprises the step of calculating a residual number of compression or cutting cycles up to a scheduled maintenance of the tool, depending on:

a predetermined initial residual number of cycles, and variable stress values representative for the mechanical stresses of the tool in the individual compression or cutting cycles, wherein the stress values are representative of:

the maximum compression or cutting forces or intervals of maximum compression or cutting forces, actually reached during each compression or cutting cycle, and wherein the calculation of the residual number of cycles for each cycle out of a sequence of consecutive cycles comprises:

the calculation of a reduction value depending on the stress value of the current cycle, wherein said reduction value is a quantity that varies from one cycle to another depending on the maximum compression or cutting forces actually reached in the individual cycles, and the calculation of the residual number of cycles remaining after the completion of the current cycle by subtracting the reduction value from a residual number of cycles calculated for the cycle prior to the current cycle.

* * * * *